United States Patent
Beall

(10) Patent No.: US 6,632,757 B2
(45) Date of Patent: *Oct. 14, 2003

(54) TRANSPARENT FORSTERITE GLASS-CERAMICS

(75) Inventor: George H. Beall, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/929,554

(22) Filed: Aug. 14, 2001

(65) Prior Publication Data

US 2002/0013206 A1 Jan. 31, 2002

Related U.S. Application Data

(63) Continuation of application No. 09/686,418, filed on Oct. 11, 2000, now Pat. No. 6,300,262.
(60) Provisional application No. 60/160,093, filed on Oct. 18, 1999, provisional application No. 60/174,012, filed on Dec. 30, 1999, and provisional application No. 60/173,863, filed on Dec. 30, 1999.

(51) Int. Cl.$^7$ .............................. C03C 10/04
(52) U.S. Cl. ................ 501/5; 501/69; 501/73; 359/342; 359/343; 372/42
(58) Field of Search ................ 501/5, 69, 73; 359/342, 343; 372/42

(56) References Cited

U.S. PATENT DOCUMENTS

| 5,717,517 A | 2/1998 | Alfano et al. ............... 359/342 |
| 5,958,807 A | 9/1999 | Kumar et al. .................. 501/5 |
| 6,017,642 A | 1/2000 | Kumar et al. ............... 428/630 |
| 6,300,262 B1 * | 10/2001 | Beall .............................. 501/5 |

* cited by examiner

Primary Examiner—Karl Group
(74) Attorney, Agent, or Firm—Vincent T. Kung

(57) ABSTRACT

A glass-ceramic which is substantially and desirably totally transparent, and which contains a predominant crystal phase of forsterite. The glass-ceramic is formed from precursor glasses having the following compositions, in weight percent on an oxide basis: $SiO_2$ 30–60; $Al_2O_3$ 10–25; MgO 13–30; $K_2O$ 8–20; $TiO_2$ 0–10; and $GeO_2$ 0–25. The glass-ceramic may be doped with up to 1 wt. % chromium oxide to impart optical activity thereto.

10 Claims, 1 Drawing Sheet

TRANSPARENT FORSTERITE GLASS-CERAMICS

CROSS-REFERENCE TO RELATED APPLICATIONS

This Application claims benefit of priority of U.S. Provisional Application No. 60/160,093, filed on Oct. 18, 1999, and of U.S. Provisional Application No. 60/173,863, and U.S. Supplemental Provisional Application No. 60/174,012, both filed on Dec. 30, 1999, and is a continuation of co-pending, U.S. application Ser. No. 09/686,418, entitled "TRANSPARENT FORSTERITE GLASS-CERAMIC," filed in the name of George H. Beall, on Oct. 11, 2000, now issued as U.S. Pat. No. 6,300,262.

An application entitled TRANSITION-METAL GLASS-CERAMIC GAIN MEDIA, filed as a United States Provisional Application Ser. No. 60/160,053, on Oct. 18, 1999, in the names of George H. Beall et al., and assigned to the same assignee as this application, is directed to transition-metal doped, glass ceramic materials that exhibit properties that make them suitable as gain media for use in optical amplifiers and/or laser pumps.

An application entitled GLASS-CERAMICS BASED ON ALPHA- AND BETA-WILLEMITE, filed as a United States Provisional Application Ser. No. 60/160,138, on Oct. 18, 1999, in the name of Linda R. Pinckney, and assigned to the same assignee as this application, is directed to a substantially transparent, alpha- and beta-willemite glass-ceramic which may be doped with transition-metals to impart optical activity thereto.

An application entitled TRANSPARENT (LITHIUM, ZINC, MAGNESIUM) ORTHOSILICATE GLASS-CERAMICS, filed as a United States Provisional Application Ser. No. 60/159,967, on Oct. 18, 1999, in the names of George H. Beall and Linda R. Pinckney, and assigned to the same assignee as this application, is directed to transition-metal-doped, glass-ceramic materials that exhibit properties that make them suitable as gain media in optical amplifiers and/or laser pumps.

An application entitled GLASS-CERAMIC FIBER AND METHOD, filed as United States Provisional Application Ser. No. 60/160,052 on Oct. 18, 1999 in the names of George H. Beall, Linda R. Pinckney, William Vockroth and Ji Wang and assigned to the same assignee as this application, is directed to glass-ceramic materials containing nanocrystals and being doped with a transition metal, and to a method of producing such glass-ceramics in the form of optical fibers.

FIELD OF THE INVENTION

The present invention relates to transparent glass ceramics, in particular, to substantially transparent glass-ceramics based on a predominant crystal phase of forsterite.

BACKGROUND OF THE INVENTION

Glass-ceramics are polycrystalline materials formed by a controlled crystallization of a precursor glass. The method for producing such glass-ceramics customarily involves three fundamental steps: first, a glass-forming batch is melted; second, the melt is simultaneously cooled to a temperature at least below the transformation range thereof and a glass body of a desired geometry shaped therefrom; and third, the glass body is heated to a temperature above the transformation range of the glass in a controlled manner to generate crystals in situ.

Frequently, the glass body is exposed to a two-stage treatment. Hence, the glass will be heated initially to a temperature within, or somewhat above, the transformation range for a period of time sufficient to cause the development of nuclei in the glass. Thereafter, the temperature will be raised to levels approaching, or even exceeding, the softening point of the glass to cause the growth of crystals on the previously-formed nuclei. The resultant crystals are commonly more uniformly fine-grained and the articles are typically more highly crystalline. Internal nucleation allows glass-ceramics to possess such favorable qualities as a very narrow, particle size distribution and highly uniform dispersion throughout the glass host.

Transparent glass-ceramics are well known to the art; the classic study thereof being authored by G. H. Beall and D. A. Duke in "Transparent Glass-Ceramics", *Journal of Materials Science*, 4, pp. 340–352 (1969). Glass-ceramic bodies will display transparency to the human eye when the crystals present therein are considerably smaller than the wavelength of visible light. More specifically, transparency generally results from crystals less than 50 nm, and preferably as low as 10 nm, in size. Transparency in glass-ceramics can also be produced with crystals larger than 50 nm if the crystal birefringence and the index of refraction mismatch between the crystal phase and the glassy phase are both low.

Recently, much effort has been concentrated in the area of using transparent glass-ceramics as hosts for transition metals which act as optically active dopants. Suitable glass-ceramic hosts must be tailored such that transition elements will preferentially partition into the crystals. Co-pending application Ser. No. 60/160,053, entitled "Transition Metal Glass-Ceramics," by Beall et al., is co-assigned to the present assignee, and is herein incorporated by reference in its entirety. It is directed at transition-metal doped glass-ceramics suitable for formation of a telecommunications gain or pump laser fiber.

Transparent glass-ceramics, which contain a relatively small volume percentage of crystals, can be of great use in cases where the parent glass provides an easy-to-melt or an-easy-to-form vehicle for a crystal. The crystal, in itself, may be difficult or expensive to synthesize, but may provide highly desirable features, such as optical activity. The crystals in the glass-ceramic are generally oriented randomly throughout the bulk of the glass, unlike a single crystal which has a specific orientation. Random orientation, and consequent anisotropy, are advantageous for many applications, one example being that of optical amplifiers, where polarization-independent gain is imperative.

Transparent glass-ceramics, doped with transition elements, can combine the optical efficiency of crystals with the forming flexibility of glass. For example, both bulk (planar) and fiber forms can be fabricated from these glass-ceramics.

Therefore, there exists a need for transparent, glass-ceramic materials which contain small tetrahedral and interstitial sites, and hence are suitable as potentially valuable hosts for small, optically active, transition elements. Such elements include, but are not limited to, $Cr^{4+}$, $Cr^{3+}$, $Co^{2+}$, $Cu^{2+}$, $Mn^{2+}$, $Ni^{2+}$, $Fe^{3+}$, $Fe^{2+}$, and $Cu^+$, which impart luminescence and fluorescence thereto. The doped glass-ceramic materials are suitable for application in the optical field industry.

In the late 1980s, it was discovered that chromium-doped, forsterite, single crystals could be used as a laser material in the 1210 nm to 1260 nm range. Further work determined that the active ion was $Cr^{4+}$, a rare valence state of chromium, and that strong luminescence and tunable laser action could be expected in the broad spatial region from $1.1\mu$ to $1.4\mu$, and perhaps deeper into the infrared.

U.S. Pat. No. 5,717,517 is directed at a method for amplifying a signal pulse of a laser light by providing an amplifying medium which contains an elongated core having crystalline particles dispersed within a non-gaseous medium. $Cr^{4+}$ doped forsterite single crystals are provided as an example of a suitable crystalline particle.

However, what the prior art has failed to disclose, and what this invention teaches, is a forsterite glass-ceramic that is substantially transparent and suitable for employment in the fiber optics industry.

Accordingly, the primary object of the present invention is to provide glass-ceramic materials which are substantially, and desirably totally, transparent, and which contain a predominant crystal phase of forsterite.

Another object of the present invention is to provide such forsterite glass-ceramics which are capable of being doped with ingredients which confer luminescence and/or fluorescence thereto.

An important advantage of the present glass-ceramic family is that it provides a material containing forsterite crystals which selectively incorporate transition metal ions including, but not limited to $Cr^{4+}$, $Cr^{3+}$, $Co^{2+}$, $Cu^{2+}$, $Mn^{2+}$, $Ni^{2+}$, $Fe^{3+}$, $Fe^{2+}$, and $Cu^{+}$. The material is glass-based, thus providing the important flexibility of allowing for fabrication of both bulk (such as planar substrates) and fiber (such as optical fiber) forms.

Other objects and advantages of the present invention will be apparent from the following description.

BRIEF SUMMARY OF THE INVENTION

In accordance with the present invention, there is provided a transparent glass-ceramic containing a predominant crystal phase of forsterite and having a composition consisting essentially of, in weight percent on an oxide basis, $SiO_2$ 30–60; $Al_2O_3$ 10–25; MgO 13–30; $K_2O$ 8–25; $TiO_2$ 0–10; and $GeO_2$ 0–25.

The most preferred composition range, for best transparency, is based on a composition consisting essentially, in weight percent on an oxide basis, of $SiO_2$ 43–55; $Al_2O_3$ 12–20; MgO 15–25; $K_2O$ 10–17; and $TiO_2$ 3–8. To obtain optical activity, i.e., fluorescence, over the communications transmission wavelength range of 1100 to 1700 nm, the present inventive, forsterite glass-ceramics are doped with up to 1 wt. % chromium oxide, and preferably with 0.003 to 0.3 wt. % chromium oxide.

A method of making the inventive glass-ceramic materials is also provided comprising the steps of:

a.) melting a batch for a glass having a composition consisting essentially, in weight percent on an oxide basis, of $SiO_2$ 30–60; $Al_2O_3$ 10–25; MgO 13–30; $K_2O$ 8–25; $TiO_2$ 0–10; and $GeO_2$ 0–25.

b.) cooling the glass to a temperature at least below the transformation range of the glass;

c.) exposing the glass to a temperature between about 600–1000° C. for a period of time sufficient to cause the generation of a glass-ceramic which is substantially transparent and which contains a predominant crystal phase of forsterite; and, d.) cooling the glass-ceramic to room temperature.

DETAILED DESCRIPTION OF THE INVENTION

Figure 1:
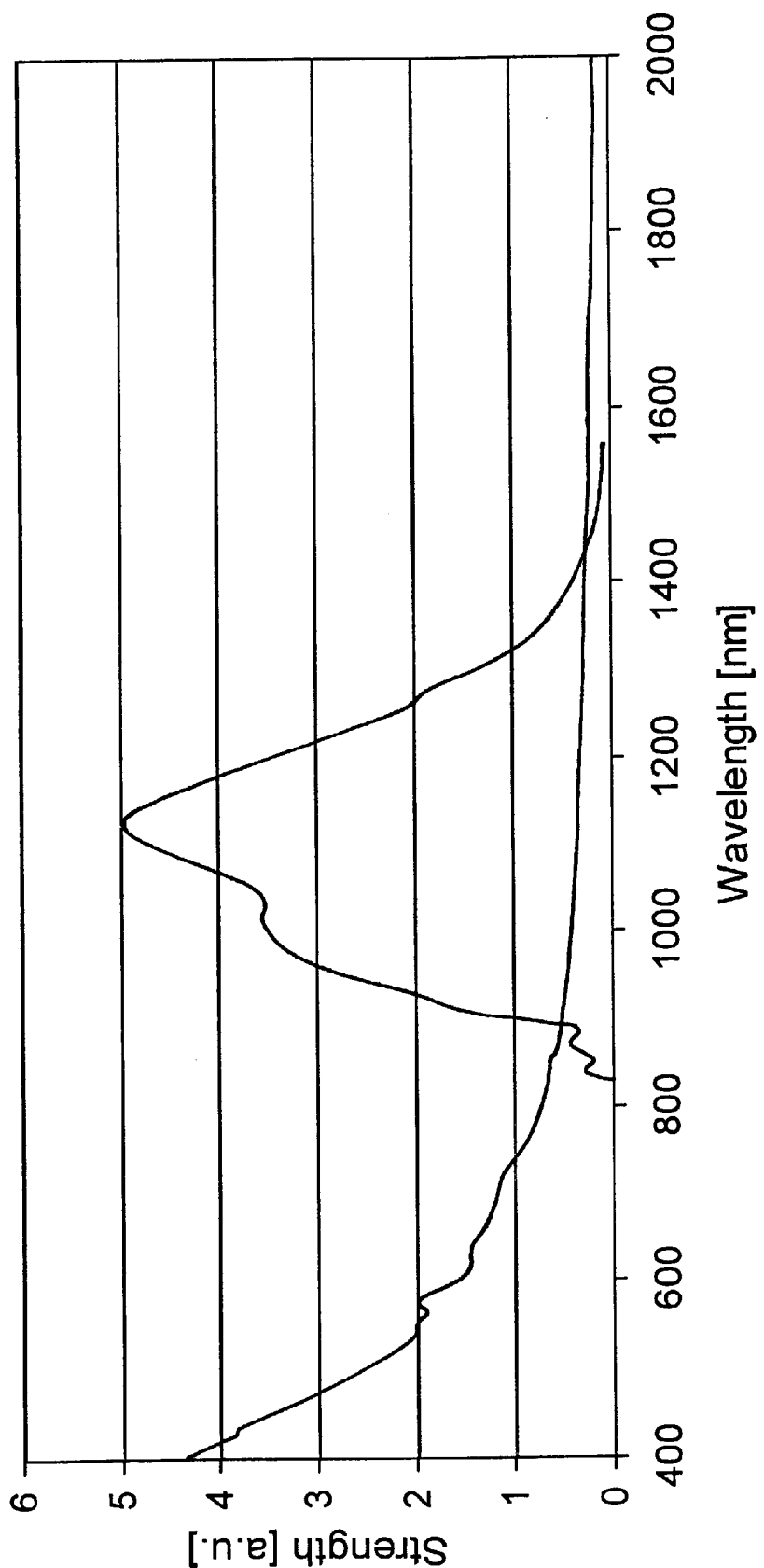
FIG. 1 shows the fluorescence spectra for the glass-ceramic of Example 3 doped with 0.05 wt. % $Cr_2O_3$.

The present invention is based on the discovery of a family of compositions that can produce glasses of excellent stability which can be cerammed to produce substantially transparent glass-ceramics containing forsterite as the predominant crystal phase. The present inventive forsterite glass-ceramics are suitable for employment in the telecommunications industry when doped with transition metal-ions, such as $Cr^{4+}$.

Forsterite ($Mg_2SiO_4$), an orthosilicate of the olivine family with only 33 mole % silica, does not form a glass, even on rapid quenching. The challenge, then, was to create a stable glass from which forsterite, and not the more siliceous Mg-rich crystals like enstatite ($MgSiO_3$), could form. The best approach seemed to be to attempt to produce a stable glass with a tendency towards amorphous phase separation on cooling or subsequent reheating.

The dispersed phase could be made rich in MgO and the continuous phase rich in glass-formers like silica and alumina.

Hence, the present inventive, substantially transparent glass-ceramic is based on a composition consisting essentially, in weight percent on an oxide basis, of

| | |
|---|---|
| $SiO_2$ | 30–60 |
| $Al_2O_3$ | 10–25 |
| MgO | 13–30 |
| $K_2O$ | 8–20 |
| $TiO_2$ | 0–10 |
| $GeO_2$ | 0–25 |

It should be noted that alkali other than $K_2O$ can be used. Partial molar replacement of $K_2O$ up to about 50%, by $Li_2O$, $Na_2O$, $Rb_2O$, and $Cs_2O$ is possible.

The most preferred composition range, for best transparency, is based on a composition consisting essentially, in weight percent on an oxide basis, of

| | |
|---|---|
| $SiO_2$ | 43–55 |
| $Al_2O_3$ | 12–20 |
| MgO | 15–25 |
| $K_2O$ | 10–17 |
| $TiO_2$ | 3–8 |

To secure fluorescence in the inventive, substantially transparent forsterite glass-ceramics, up to 1 wt. % chromium oxide is added to the parent glass, with the preferred range being about 0.003 to 0.3 wt. % chromium oxide.

The following Table sets forth a number of glass compositions, expressed in terms of parts by weight on the oxide basis, illustrating the parameters of the present invention. The Table also presents the ceramming schedule in °C. and hours, as well as the crystal phases observed in each resulting glass-ceramic.

Inasmuch as the sum of the individual components in each recited glass approximates 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

|  | 1 | 2 | 3 | 4 | 5 | 6 | 7 | 8 | 9 |
|---|---|---|---|---|---|---|---|---|---|
| $SiO_2$ | 50.4 | 50.1 | 50.4 | 51.5 | 37.6 | 51.3 | 48.7 | 48.1 | 45.6 |
| $GeO_2$ | — | — | — | — | 16.2 | — | — | — | — |
| $Al_2O_3$ | 14.7 | 14.0 | 14.7 | 15.0 | 13.7 | 16.4 | 17.7 | 14.0 | 18.7 |
| MgO | 21.4 | 22.9 | 21.4 | 21.9 | 19.9 | 17.2 | 17.2 | 25.0 | 18.4 |
| $K_2O$ | 13.5 | 13.0 | 13.5 | 10.5 | 12.6 | 15.1 | 16.4 | 12.9 | 17.3 |
| $Li_2O$ | — | — | — | 1.0 | — | — | — | — | — |
| $TiO_2$ ǀ | — | — | 4.0 | — | 3.7 | 5.0 | 5.0 | 5.0 | 4.9 |
| $Cr_2O_3$ *ǀ | 0.1 | — | 0.1 | — | 0.07 | 0.25 | 0.155 | 0.155 | 0.155 |
| $As_2O_5$ ǀ | 0.4 | — | — | — | — | — | — | — | — |
| Glass | green | clear | olive green | olive green | olive green | dark green | green, olive tint | green, olive tint | green, olive tint |
| Ceram. Cycle °C.-hr | 750-4 850-2 | 750-4 900-2 | 750-2 900-4 | 750-2 850-4 | 750-2 900-4 | 750-2 900-4 | 750-8 900-2 | 750-4 900-1 | 750-4 900-1 |
| Glass-Ceramic | medium grained; translucent | medium grained; translucent | fine grained; translucent brownish | medium grained | fine grained transparent | very fine grained; translucent brown | very fine grained; translucent green-brown | very fine grained; translucent green-brown | very fine grained; translucent green-brown |
| Crystal Phase | forsterite | forsterite | forsterite | forsterite | forsterite | forsterite | forsterite | forsterite | forsterite |

ǀexcess of 100%
*total chromium oxide as $Cr_2O_3$

The exemplary glasses were produced in the following manner. The batch materials were compounded, mixed together to assist in securing a homogeneous melt, and then placed into platinum crucibles. The crucibles were introduced into a furnace operating at temperatures of 1400–1600° C., and the batches were melted for 4–16 hours. The melt was poured as free "patties" and transferred to an annealer operating at about 550–600° C.

The glass patties were subjected to a ceramming cycle by placing them into a furnace and heat treating according to the following schedule: a first exposure to a temperature within the range of about 600–800° C. for a period of time sufficient to generate the development of nuclei therein, usually about between 2–16 hours. Second, the nucleated glass patties were then exposed to a temperature within the range of about 900–1000° C. for a period of time sufficient to effect the growth of crystals on the nuclei. The period of time will generally be about between 1–4 hours.

The inventive compositions are self-nucleating due to liquid-liquid phase separation and therefore require no added nucleating agents. More specifically, nucleation is promoted by amorphous phase separation. However, even though nucleating agents are not required, in most cases the addition of nucleating agents, such as $TiO_2$ (up to 5 wt. %), results in a finer crystal size and improved transparency.

The crystalline phases of the resulting glass-ceramic materials were identified using X-ray powder diffraction.

In the inventive glass-ceramics, transparency is a function of the microstructure which is a function of the composition and heat treatment. The microstructure of the inventive glass-ceramics contains forsterite microcrystals of 10–50 nm in size (in preferred compositions) in a stable alkali aluminosilicate glass. The total crystallinity ranges from about 10% to 50% by volume depending on the individual composition. The forsterite microcrystals which make-up the crystalline phase are internally grown in the base glass during the ceramming cycle.

The forsterite crystal structure in the present inventive, glass-ceramic material provides both tetrahedral and octahedral cation sites of appropriate size to house transition metal cations. Specifically, the forsterite microcrystals can concentrate certain transition metals into specific crystalline sites, for example $Cr^{4+}$ into tetrahedrally-coordinated sites, and $Cr^{3+}$, $Ni^{2+}$, $Co^{2+}$, $Cu^{2+}$, and $Mn^{2+}$ into octahedrally-coordinated sites. Thereby, optical activity is obtained in the inventive glass-ceramics.

As known in the optics and laser art, crystals with tetrahedrally-coordinated $Cr^{4+}$ ions provide unique optical characteristics. Therefore, in one possible application, the present inventive, transparent, forsterite glass-ceramics doped with transition metal ions, are suitable for employment in the optics and laser industries in such specific applications as optical amplifiers and pump lasers.

In laboratory experiments, Example 3 was doped with 0.05 wt. % $Cr_2O_3$, and fluorescence measurements were taken. As shown in FIG. 1, the chromium emission spectra for the present forsterite glass-ceramics vary with the state of oxidation. Generally, a $Cr^{3+}$ peak just below 1 μm is observed as a shoulder on a $Cr^{4+}$ peak centered near 1.2 μm. The latter is enhanced by increasing the state of oxidation of the parent glass.

Potential applications for the present inventive, substantially transparent, forsterite glass-ceramic materials include femtosecond and tunable lasers, wide-band optical fiber amplifiers, and regenerative amplifiers in the near infrared.

Although the present invention has been fully described by way of examples, it is to be noted that various changes and modifications will be apparent to those skilled in the art. Therefore, unless otherwise such changes and modifications depart from the scope of the present invention, they should be construed as included therein.

I claim:

1. An optically active telecommunications device comprising:
   a transparent glass-ceramic containing a predominant crystal phase of forsterite, said glass-ceramic having a composition, in weight percent on an oxide basis, comprising about:
   30–60% $SiO_2$;
   10–25% $Al_2O_3$;
   13–30% MgO;
   8–20% $K_2O$;

0–10% $TiO_2$;
0–25% $GeO_2$;
with about 1% or less of $Cr_2O_3$; and said device exhibiting a fluorescence spectrum from about 800 nm to about 1550 nm, with a maximum within the range of about 900 nm to about 1400 nm.

2. The optically active telecommunication device according to claim 1, wherein said fluorescence maximum is at about 1180 nm.

3. The optically active telecommunication device according to claim 1, wherein said $Cr_2O_3$ content is at least about 0.003 wt %.

4. The optically active telecommunication device according to claim 1, wherein said $Cr_2O_3$ content is about 0.6 wt % or less.

5. The optically active telecommunication device according to claim 1, wherein said forsterite crystal phase concentrates one or more transition metal ions selected from the group consisting of $Cr^{4+}$, $Cr^{3+}$, $Co^{2+}$, $Cu^{2+}$, $Mn^{2+}$, $Ni^{2+}$, $Fe^{3+}$, $Fe^{2+}$, and $Cu^{1+}$ into tetrahedrally-coordinated sites and octahedrally-coordinated sites.

6. The optically active telecommunication device according to claim 1, wherein said glass-ceramic has a composition, in weight percent on an oxide basis, consisting essentially of about:
43–55% $SiO_2$;
12–20% $Al_2O_3$;
15–25% MgO;
10–17% $K_2O$;
3–8% $TiO_2$.

7. The optically active telecommunication device according to claim 1, wherein the glass-ceramic has forsterite crystals ranging from about 10 nm to about 50 nm in size.

8. The optically active telecommunication device according to claim 1, wherein the glass-ceramic has a total crystallinity ranging from about 10% to about 50% by volume.

9. The optically active telecommunication device according to claim 1, wherein said device is an amplifier.

10. The optically active telecommunication device according to claim 1, wherein said device is a laser.

* * * * *